United States Patent
Ke et al.

(10) Patent No.: US 10,193,977 B2
(45) Date of Patent: Jan. 29, 2019

(54) SYSTEM, DEVICE AND PROCESS FOR DYNAMIC TENANT STRUCTURE ADJUSTMENT IN A DISTRIBUTED RESOURCE MANAGEMENT SYSTEM

(71) Applicant: HUAWEI TECHNOLOGIES CO., LTD., Shenzhen (CN)

(72) Inventors: Xiaodi Ke, Markham (CA); Chong Chen, Richmond Hill (CA); Jason T. S. Lam, Markham (CA); Lei Guo, Markham (CA)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 242 days.

(21) Appl. No.: 15/142,040

(22) Filed: Apr. 29, 2016

(65) Prior Publication Data

US 2017/0318091 A1    Nov. 2, 2017

(51) Int. Cl.
| | | |
|---|---|---|
| H04L 29/08 | (2006.01) | |
| H04L 12/24 | (2006.01) | |
| H04L 12/911 | (2013.01) | |

(52) U.S. Cl.
CPC ...... *H04L 67/1097* (2013.01); *H04L 41/0896* (2013.01); *H04L 41/5054* (2013.01); *H04L 47/821* (2013.01); *H04L 67/327* (2013.01)

(58) Field of Classification Search
CPC ............... H04L 67/1097; H04L 67/327; H04L 41/5054; H04L 47/821
USPC ......................................................... 709/226
See application file for complete search history.

(56) References Cited

U.S. PATENT DOCUMENTS

| | | | | |
|---|---|---|---|---|
| 7,441,022 B1 * | 10/2008 | Schuba | ............... | H04L 41/5025 706/47 |
| 7,810,098 B2 * | 10/2010 | Barillari | ................... | G06F 9/50 709/226 |
| 7,912,804 B1 * | 3/2011 | Talwar | .................. | G06Q 10/06 706/47 |
| 8,824,287 B2 * | 9/2014 | Carlstrom | ............... | H04L 47/10 370/230.1 |
| 9,514,170 B1 * | 12/2016 | Tillotson | ................. | G06F 9/546 |
| 9,864,631 B1 * | 1/2018 | Matousek | ............. | G06F 9/4831 |
| 2011/0194426 A1 | 8/2011 | Fang et al. | | |

(Continued)

FOREIGN PATENT DOCUMENTS

| | | |
|---|---|---|
| CN | 101499061 A | 8/2009 |
| CN | 103747059 A | 4/2014 |
| CN | 105471644 A | 4/2016 |

OTHER PUBLICATIONS

Shankar et al., A Policy-based Management Framework for Pervasive SYstems using Axiomatized Rule-Actions, 2005, Proceedings of the 2005 Fourth IEEE International Symposium on Network Computing and Applications, http://ieeexplore.ieee.org/stamp/stamp.jsp?arnumber=1565965.*

*Primary Examiner* — James E Springer

(74) *Attorney, Agent, or Firm* — Norton Rose Fulbright Canada LLP

(57) ABSTRACT

Methods and systems of managing workloads and resources for tenants structured as a hierarchical tenant queue defining a resource distribution policy. The tenants are modified and the system responds with dynamic adjustments to the hierarchical tenant queue and workload distribution. A rule-based workload management engine defines rules for actions for the workload to respond to the dynamic update.

19 Claims, 14 Drawing Sheets

(56) References Cited

U.S. PATENT DOCUMENTS

| | | | |
|---|---|---|---|
| 2013/0219401 A1* | 8/2013 | Bartfai-Walcott | G06F 9/4881 |
| | | | 718/103 |
| 2014/0033212 A1* | 1/2014 | Balasubramaniam | ........................ |
| | | | G06F 9/5038 |
| | | | 718/102 |
| 2014/0115595 A1* | 4/2014 | Matousek | G06F 9/5061 |
| | | | 718/103 |
| 2015/0128149 A1* | 5/2015 | Meijer | G06F 9/4843 |
| | | | 718/105 |
| 2015/0134733 A1* | 5/2015 | Maturana | H04L 43/04 |
| | | | 709/203 |
| 2016/0021136 A1* | 1/2016 | McGloin | H04L 63/1458 |
| | | | 726/23 |
| 2016/0117318 A1* | 4/2016 | Helland | G06F 17/303 |
| | | | 707/634 |
| 2016/0119246 A1* | 4/2016 | Wang | H04L 47/72 |
| | | | 709/226 |
| 2016/0204923 A1* | 7/2016 | Ashok | H04L 67/10 |
| | | | 709/226 |
| 2017/0061364 A1* | 3/2017 | Waltz | G06Q 10/06311 |
| 2017/0364385 A1* | 12/2017 | Meijer | H04N 21/23103 |

* cited by examiner

SYSTEM, DEVICE AND PROCESS FOR DYNAMIC TENANT STRUCTURE ADJUSTMENT IN A DISTRIBUTED RESOURCE MANAGEMENT SYSTEM

FIELD

This disclosure relates to dynamic tenant structure adjustment in a runtime environment of a distributed resource management system.

INTRODUCTION

Distributed resource management (DRM) systems implement resource management, workload management and scheduling. DRM systems distribute, share or allocate resources among multiple tenants of an organization. Tenants are a set of client devices belonging to a particular client, business unit, department, network (e.g. local area network, wide area network), or other physical or logical grouping of client systems, users, user groups, or the like. Tenants can have sub-tenants, in which case resources allocated to a tenant are distributed among its sub-tenants. Tenants have workloads that require resources for execution or deployment. A DRM system organizes or structures tenants in a hierarchical queue to manage the distribution, allocation, and scheduling of resources for the workloads of the tenants. A hierarchical queue expresses a resource distribution or sharing policy among clusters or groups of tenants of an organization. Tenants are mapped to the hierarchical queue. Tenants are updated and modified, which requires corresponding updates or modifications to the hierarchical queue and tenant workload assignments. Manual updates to the hierarchical queue by an administrator may be time-consuming and error-prone.

SUMMARY

In accordance with one aspect, there is provided a process for managing workloads and resources in a distributed resource management system. The process involves, in response to an update to a tenant of a hierarchical queue, receiving an action for at least one workload of the tenant, the hierarchical queue defining a resource distribution policy, the at least one workload associated with a resource request. The process involves updating the hierarchical tenant queue by applying the action for the at least one workload associated with the resource request, without interrupting the workload. The process involves scheduling the workload based on the updated hierarchical tenant queue.

In some embodiments, the process involves defining rules for the rule-based workload management engine. The rules have a component for the action for the workload. In some embodiments, the rules have a component for a tenant event to determine that the rule is applicable to the update. In some embodiments, the rules have a component for a workload matching expression to determine that the rule is applicable to the workload.

In some embodiments, the process involves sending a request for the action in response to detecting the update, the request having the update and the workload associated with the resource request for the tenant.

In some embodiments, the process involves identifying the rule based on the component for the tenant event, the component for the workload matching expression, and the component for the action for the workload, and receiving the rule in response to the request.

In some embodiments, the process involves defining rules, each rule having an action for a workload; identifying, from the rules, a set of rules applicable to the update; filtering the set of rules using the workload associated with the resource request for the tenant; upon determining that the filtered set of rules include multiple rules, ordering the filtered set of rules based on a priority sequence; and returning actions for the workload associated with the resource request for the tenant from the ordered, filtered set of rules.

In some embodiments, the process involves applying a default action to move the workload associated with the resource request for the tenant to a Lost&Found queue.

In some embodiments, the process involves determining that no rules are applicable to the dynamic update and returning one or more default rules to move the workload associated with the resource request for the tenant to a Lost&Found queue.

In some embodiments, the process involves applying the action for the workload associated with the resource request for the tenant using a default action to move the workload to a Lost&Found queue.

In some embodiments, the process involves determining that there are no applicable actions to the workload associated with the resource request for the tenant prior to applying the default action.

In some embodiments, the process involves moving the workload from the Lost&Found queue back to the hierarchical queue.

In another aspect, there is provided a distributed resource management system for managing workloads and resources. The distributed resource management system has a data storage device persistently storing a plurality of tenants structured as a hierarchical tenant queue defining a resource distribution policy. The distributed resource management system has at least one processor to configure a rule-based workload management engine defining rules, each rule defining an action for a workload. The processor configures a workload management agent to detect a dynamic update to a tenant of the hierarchical queue, the tenant having at least one workload associated with a resource request for the tenant. The distributed resource management system receives a rule defining an action for the workload associated with the resource request for the tenant. The distributed resource management system updates the data structure for the hierarchical queue by applying the action for the at least one workload associated with the resource request for the tenant and without interrupting the workload.

In some embodiments, the distributed resource management system defines rules for the rule-based workload management engine. The rules have a component for the action for the workload. In some embodiments, the rules have a component for a tenant event to determine that the rule is applicable to the update. In some embodiments, the rules have a component for a workload matching expression to determine that the rule is applicable to the workload. In some embodiments, the rules have one or more default rules to move the workload associated with the resource request for the tenant to a Lost&Found queue.

In another aspect, there is provided a device for managing workloads and resources in a distributed resource management system. The device has a processor and a memory storing instructions to configure the processor with a rule-based workload management engine. The rule-based workload management engine receives a notification of an update to a tenant of a hierarchical queue, the hierarchical queue defining a resource distribution policy. The rule-based workload management engine retrieves an action for at least one workload of the tenant, the at least one workload associated with a resource request. The rule-based workload management engine returns the action to the at least one processor to adjust the hierarchical tenant queue without interrupting the workload. The distributed resource management system can schedule the workload based on the adjusted hierarchical tenant queue.

The rule-based workload management engine has rules with a component for the action for the workload. The rule-based workload management engine has rules with a component for a tenant event to determine that the rule is applicable to the update. The rule-based workload management engine has rules with a component for a workload matching expression to determine that the rule is applicable to the workload.

Many further features and combinations thereof concerning the present improvements will appear to those skilled in the art following a reading of the instant disclosure.

DESCRIPTION OF THE FIGURES

FIGS. 10A to 13 are diagrams showing example processes implemented by a DRM system.

These drawings depict aspects of example embodiments for illustrative purposes. Variations, alternative configurations, alternative components and modifications may be made to these example embodiments.

DETAILED DESCRIPTION

The figures illustrate different computing environment and system implementations. Each different computing environment and system is referred to generally as a DRM system.

Figure 1:
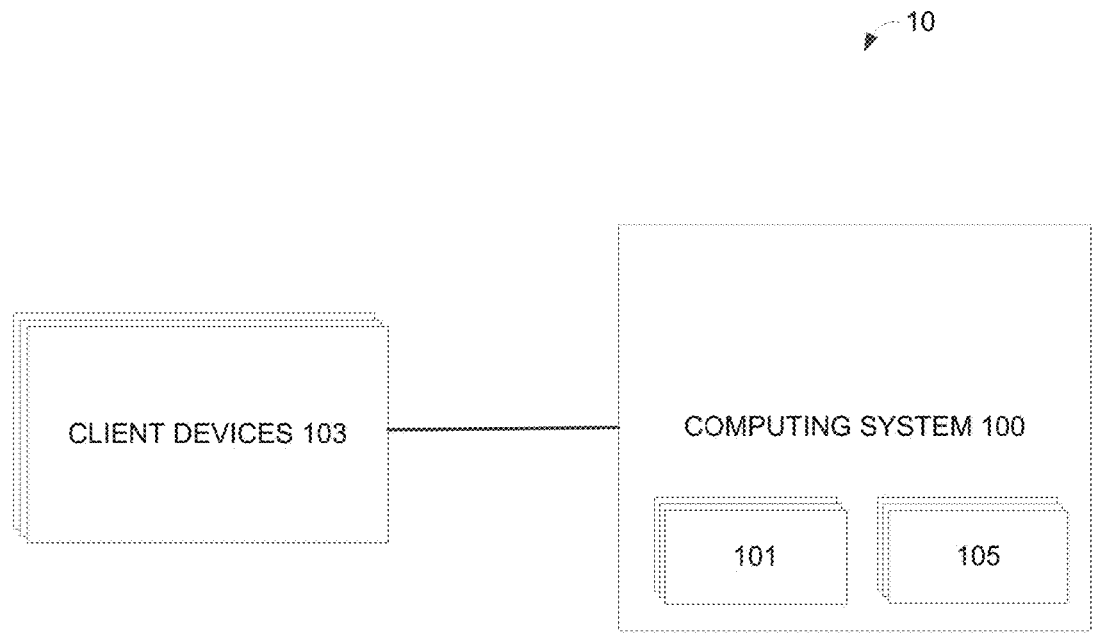
FIG. 1 is a diagram showing aspects of an example computing environment.

FIG. 1 illustrates an example distributed computing environment 10 to which aspects of the present disclosure can be applied.

In the computing environment 10, one or more client devices 103 connect to a computing system 100 to access or otherwise utilize one or more resources of the computing system 100. The computing system 100 can be a distributed computing system. In some embodiments, the DRM system is an infrastructure middleware which can run on top of a distributed environment. The distributed environment can include different kinds of hardware and software. Example DRM systems include the IBM™ Platform Load Sharing Facility (LSF), Apache™ Hadoop, YARN (Yet Another Resource Negotiator), PBS (Portable Batch Scheduler), OpenStack™, Huawei™ FusionSphere™, FusionCube™ and FusionInsight™.

The computing system 100 distributes shared computing resources among users and groups of users of an organization, referred to as tenants. Having multiple tenants enables a resource manager or administrator to support diverse workloads across a shared pool, group or cluster of computing resources. A shared multi-tenant environment may have a multi-layered tenancy structure for sharing computing resources between applications, application frameworks, different users and groups, and even different lines of business according to a resource distribution policy.

In some embodiments, computing system 100 configures a DRM system with a rule-based workload management engine. The rule-based workload management engine provides dynamic tenant structure adjustment in the runtime environment of the DRM system.

The computing system 100 includes hardware and software components. For example, a computing system 100 includes a combination of computing devices, processors, networks, memories, storage devices, network devices, power sources, license servers (e.g., software license servers), swap space, and the like. The computing system 100 can be a heterogeneous or a homogenous environment, and can have different or similar hardware components running different or similar operating systems. In some embodiments, the computing system 100 can be a single physical or logical device, such as a single computing device or a single server having one or more resources.

The computing system 100 includes one or more resources 105 which can be shared between, or otherwise utilized by, multiple workloads or tasks. Some resources 105 are physically or logically associated with a single device. Other resources 105 are shared resources available for use by multiple devices in the computing system 100.

Irrespective of the number or configuration of devices, networks, hardware, software and/or other resources in the computing system 100, in some embodiments, the computing system 100 is configured to appear as a single image or interface to the client devices 103. The computing system 100 is configured to run workloads from the client devices 103 and from components of the computing system 100 itself.

The computing system 100 includes one or more processors 101 in a single device or split across any number of devices in the computing system 100. These processors 101 can be configured to manage the resources 105 in the computing system 100.

In some embodiments, computing system 100 provides a single system image to client devices 103, and can handle resource management, workload management and scheduling.

Workloads are associated with different tenants of the DRM system. The resources used to run the workloads are allocated to the associated tenants. For example, workloads include batch jobs (e.g., high performance computing (HPC) batch jobs), Message Passing Interface (MPI) processes, serial and/or parallel batch workloads, real time analytics, elastic applications (e.g., MapReduce), long running services, virtual machines, containers, etc. Workloads can refer to any task, process, job, service to be run or executed on the computing system 100.

Figure 2:
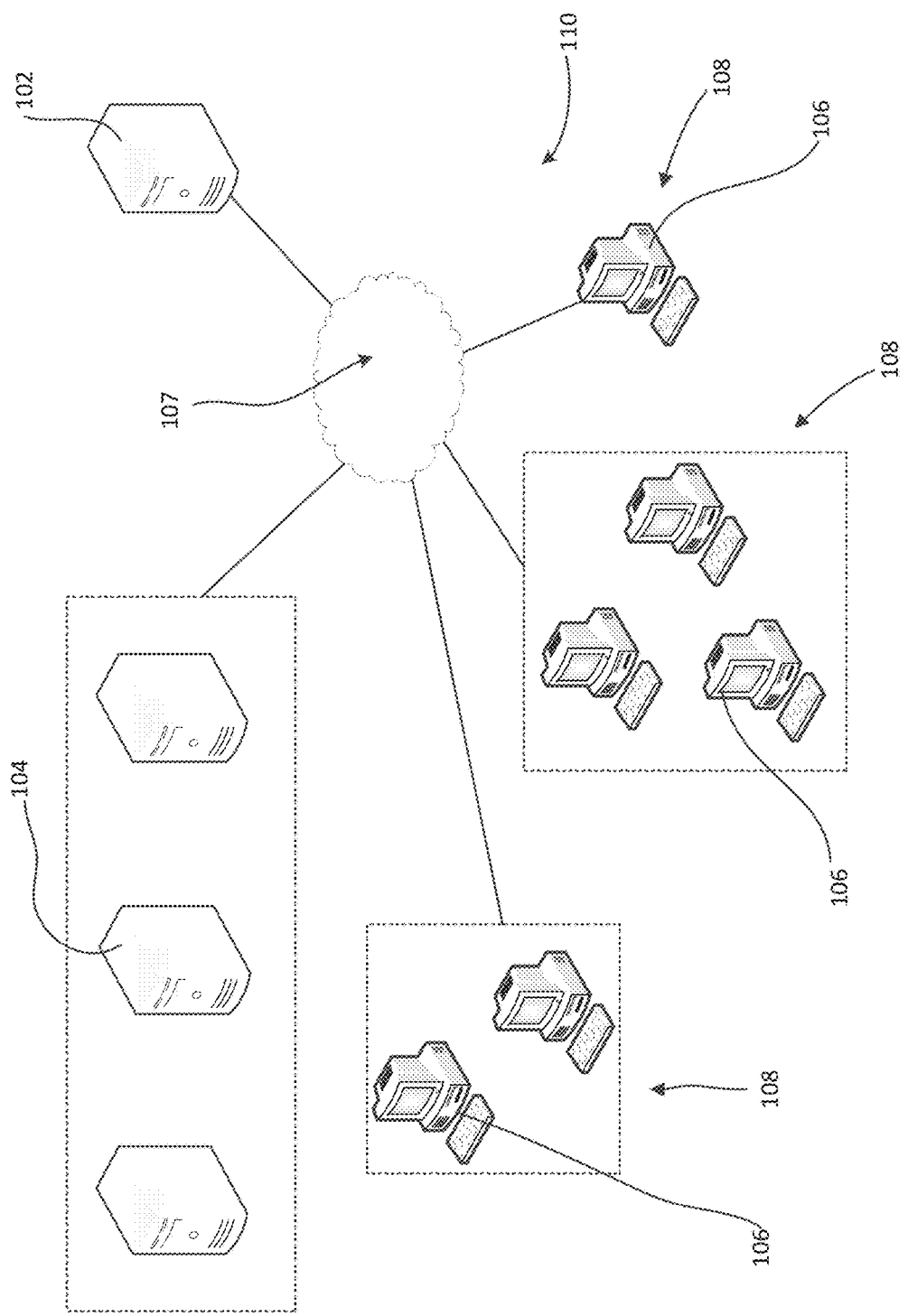
FIG. 2 is a diagram showing aspects of another example computing environment.

FIG. 2 illustrates another example system 110 for distribution of computing resources among tenants. The system 110 configures the tenant structure in a hierarchical queue. System 110 includes distributed hardware and software components. Example components are also described in relation to computing system 100 of FIG. 1.

DRM systems distribute, share or allocate resources among multiple tenants. The resources allocated to a tenant can be distributed among its sub-tenants. A tenant with no sub-tenants can be referred to as a "leaf tenant".

A hierarchical queue organizes or structures tenants of an organization to manage the distribution and allocation of resources for workloads of the tenants. The hierarchical queue is configured and managed as part of a resource distribution policy or policy configuration. For example, a resource distribution policy of the hierarchical queue indicates the sharing policy for resources in a resource pool. Example resource distribution policies include reserved resources, minimum guaranteed resource allocation, share policies, and maximum resource allocation for the hierarchical queue.

A hierarchical queue defines a structure or graph of nodes for a resource sharing policy among clusters or groups of tenants of an organization. A tenant is mapped to a node in a data structure defining the hierarchical queue. The hierarchical queue is persistently stored in a data storage device. Tenant nodes are connected to nodes for their respective sub-tenants. The hierarchical queue provides a tenant structure that can be associated with a particular resource pool to support resource distribution policies.

Tenants are associated with tasks or workloads, either directly or indirectly via sub-tenants. Sub-tenants belonging to a particular higher-level tenant are referred to as children of the higher-level tenant. Higher-level tenants that have sub-tenants are referred to as parents of the sub-tenants.

The hierarchical queue tenants are mapped to a node structure, in which each node represents a tenant. Workloads or tasks associated with tenants are submitted to nodes of the hierarchical queue for execution and deployment using the allocated resources. Tenant nodes of the hierarchical queue are updated and modified, which requires corresponding updates or modifications to the hierarchical queue and the workloads. The DRM system 110 configures a rule-based workload management engine for dynamic tenant structure adjustment in the runtime environment of the DRM system.

Figure 3A:
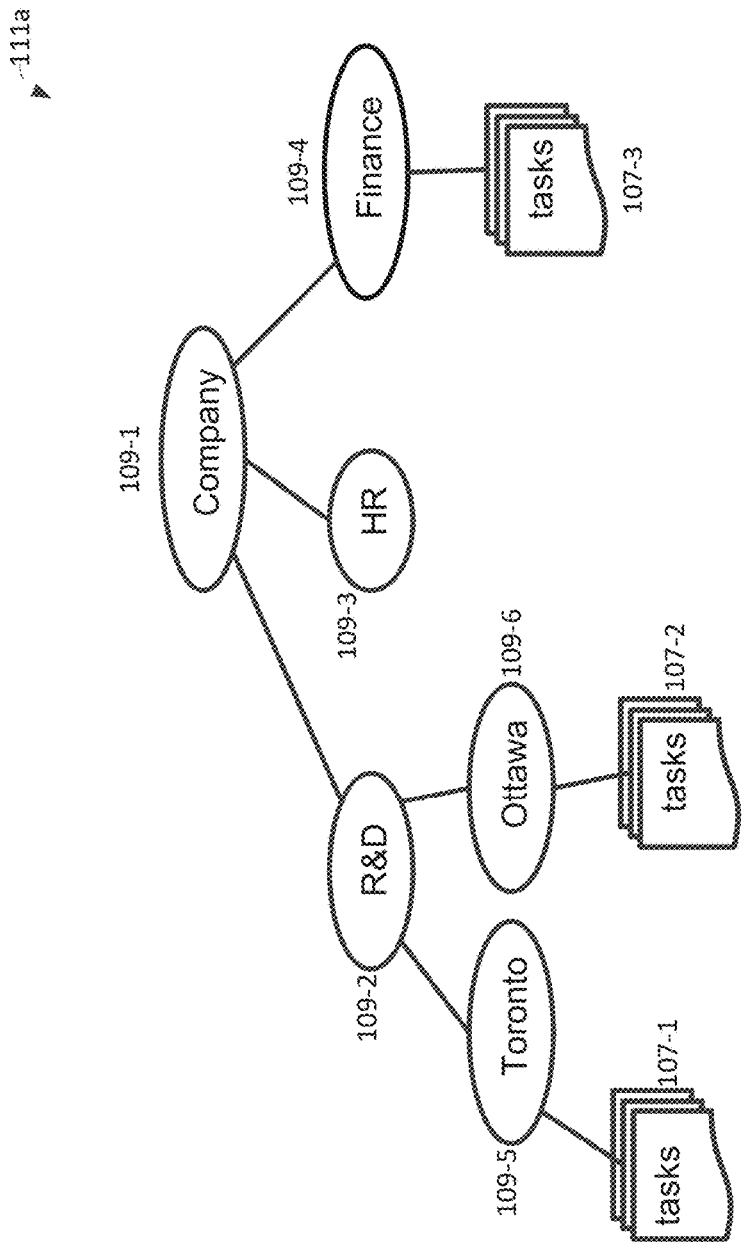
FIGS. 3A and 3B are diagrams showing example hierarchical queues.

FIG. 3A illustrates an example hierarchical queue 111a for a DRM system. Policy configurations indicate how to distribute the resources of a tenant among its sub-tenants. A workload can be submitted to a leaf tenant or a non-leaf tenant.

The hierarchical queue 111a represents a company 109-1 divided into three departments represented as three tenants: tenant R&D 109-2, tenant HR 109-3 and tenant Finance 109-4. The tenant R&D 109-2 is further divided into two teams or groups, tenant Toronto 109-5 and tenant Ottawa 109-6. Workloads 107-1, 107-2, 107-3 are submitted to leaf tenants, which, in the example hierarchical queue 111a, are tenant Toronto 109-52, tenant Ottawa 109-6, tenant HR 109-3 and tenant Finance 109-3. The example leaf tenant Toronto 109-5 links to example workloads 107-1. An example non-leaf tenant is tenant R&D 109-2 with sub-tenant Toronto 109-5.

The hierarchical queue 111a changes when there are updates to the tenants. The hierarchical queue can be updated and modified as needed, for example in response to changes in the organization of the company 109-1. As a result of these updates, a leaf tenant can become a non-leaf tenant or vice versa. When the tenant organization is updated, it is desirable to efficiently reallocate the workloads of tenants that have been modified.

To align with the operation of a company, a tenant in the hierarchy queue can be updated and modified as needed. For example, an internal department may have one team originally and it may be sufficient to have only one department as a leaf tenant to hold all workloads from that team. The department can expand and open new offices. Computing resources allocated to the department can be shared among the teams. The leaf tenant for the department becomes a non-leaf tenant for the department with three leaf tenants for its teams. As another example, a department may reduce from having multiple teams to only one team. A non-leaf tenant for the department may update to a leaf tenant for the department and its only team.

Figure 3B:
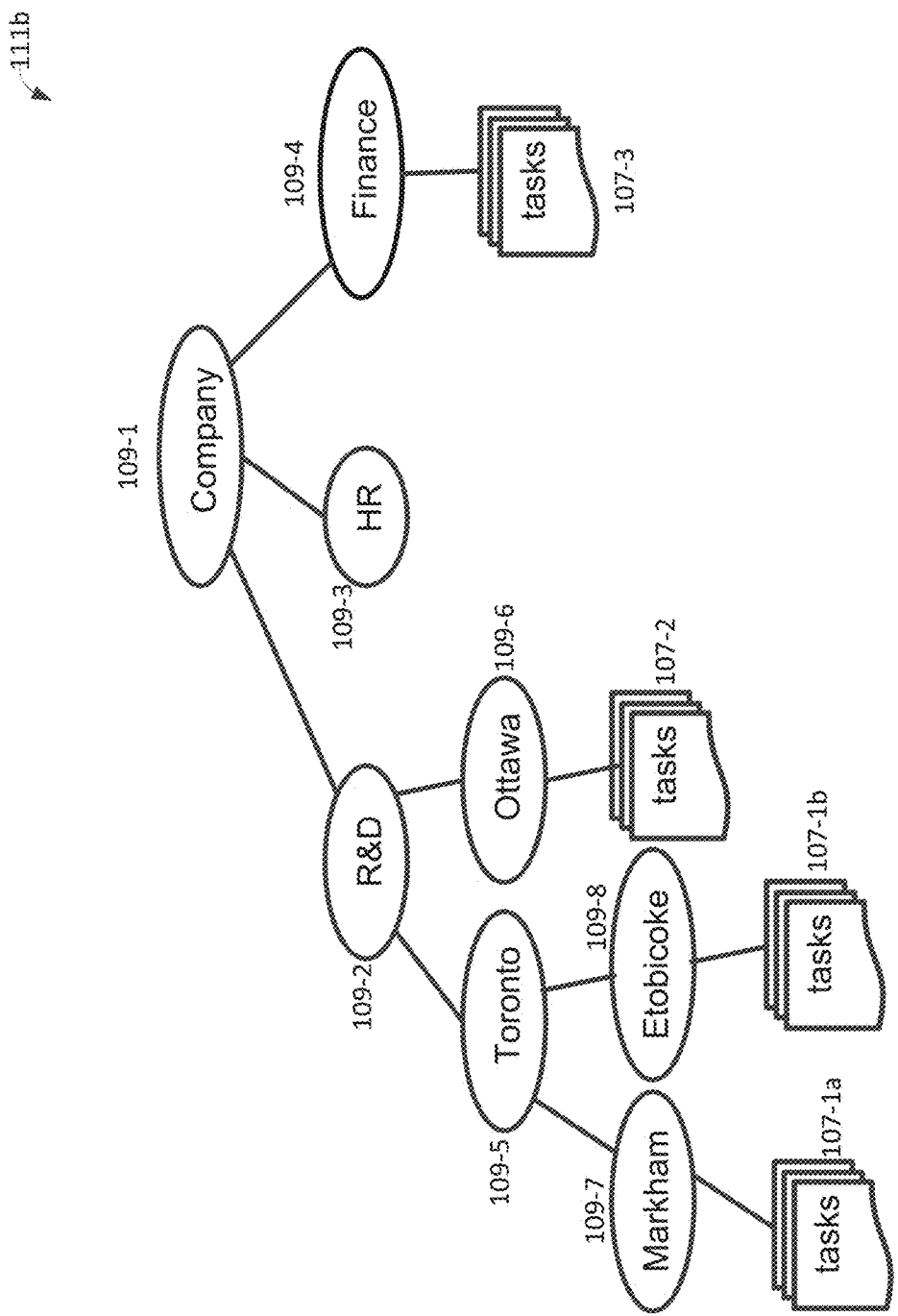

FIG. 3B shows an example hierarchical queue 111b that results from a modification of the hierarchical queue 111a of FIG. 3A. In particular, the tenant 109-5 is now a non-leaf tenant, and has two sub-tenants 109-7, 109-8. The two sub-tenants 109-7, 109-8 are leaf tenants. The workloads 107-1 previously associated with the tenant 109-5 are redistributed between the two leaf tenants 109-7, 109-8 as workloads 107-1a, 107-1b.

In an aspect, embodiments described herein implement a DRM system using one or more of computing system 100, master server 102 and/or resource servers 104. The DRM system has a rule-based workload management engine to support dynamic tenant structure adjustment. This approach improves limitations of existing DRM systems. The embodiments described herein provide a device, system and process to adjust the hierarchical queue dynamically and redistribute workloads associated with the tenant update in the runtime environment of the DRM system. When the tenant organization is modified, the rule-based workload management engine locates rules that have a field "tenant event" that corresponds to the tenant update and returns the located rules. The rules have pre-defined actions for workloads. The DRM system can apply the actions for individual workloads to adjust the tenant structure. If there are no pre-defined rules for the modification, a workload might not be redistributed to a tenant of the hierarchical queue. These workloads are referred to as orphan workloads. A default rule has an action that moves orphan workloads to a Lost&Found queue to run. The Lost&Found queue is a node similar to a tenant in the hierarchical queue and allocated resources by the distribution policy. The Lost&Found queue is treated as a tenant node in the hierarchical queue. Furthermore, the DRM system defines rules that allow workloads in the Lost&Found queue to move back to a tenant node. The DRM system can define rules associated with the Lost&Found queue. When there is a tenant update, the DRM system can move the workload from the Lost&Found queue back to a tenant node.

The embodiments described herein provide flexibility because they do not require restarting the DRM system and the resulting interruption to workloads to adjust tenant organization. Orphan workloads are preserved and may run in a Lost&Found queue. Pre-defined rules for workload management permit efficient administration of the DRM system.

For illustration, the DRM system will be described with reference to FIG. 2. System 110 includes a master server 102 and a plurality of resource servers 104. System 110 further includes one or more client computing devices 106. Computing resources provided by resource servers 104 are shared among client computing devices 106. Client computing devices 106 request resources for execution of workloads and the master server 102 allocates resources for execution of such workloads.

Master server 102 allocates resources according to a distribution policy that allows for flexible distribution. Features of the system 110 and distribution policy allow for scalability and adjustment.

Master server 102, resource servers 104 and client computing devices 106 can be interconnected via one or more networks 107, which can be IPv4, IPv6, X.25, IPX compliant or similar networks, including one or more wired or wireless access points. The networks can be local-area networks (LANs) or wide-area networks (WANs), such as the internet, and can be connected with other communications networks (e.g, GSM, GPRS, 3G, 4G, LTE networks).

Example client computing devices 106 include personal computers, tablet computers, smartphones, or the like, running Microsoft Windows, Apple OS X or iOS, Android, Linux, or other suitable operating systems. Client computing devices 106 are organized in one or more tenant groups 108 of associated computing devices. Tenant groups 108 can each be, for example, a set of client devices 106 belonging to a particular client, department, network (e.g. LAN), or other physical or logical grouping of client systems 106. As depicted, computing system 106 has three tenant groups 108, which are shown as groups of 2, 3 and 1 client computing systems 106. There can be more or fewer tenant groups 108.

Figure 4:
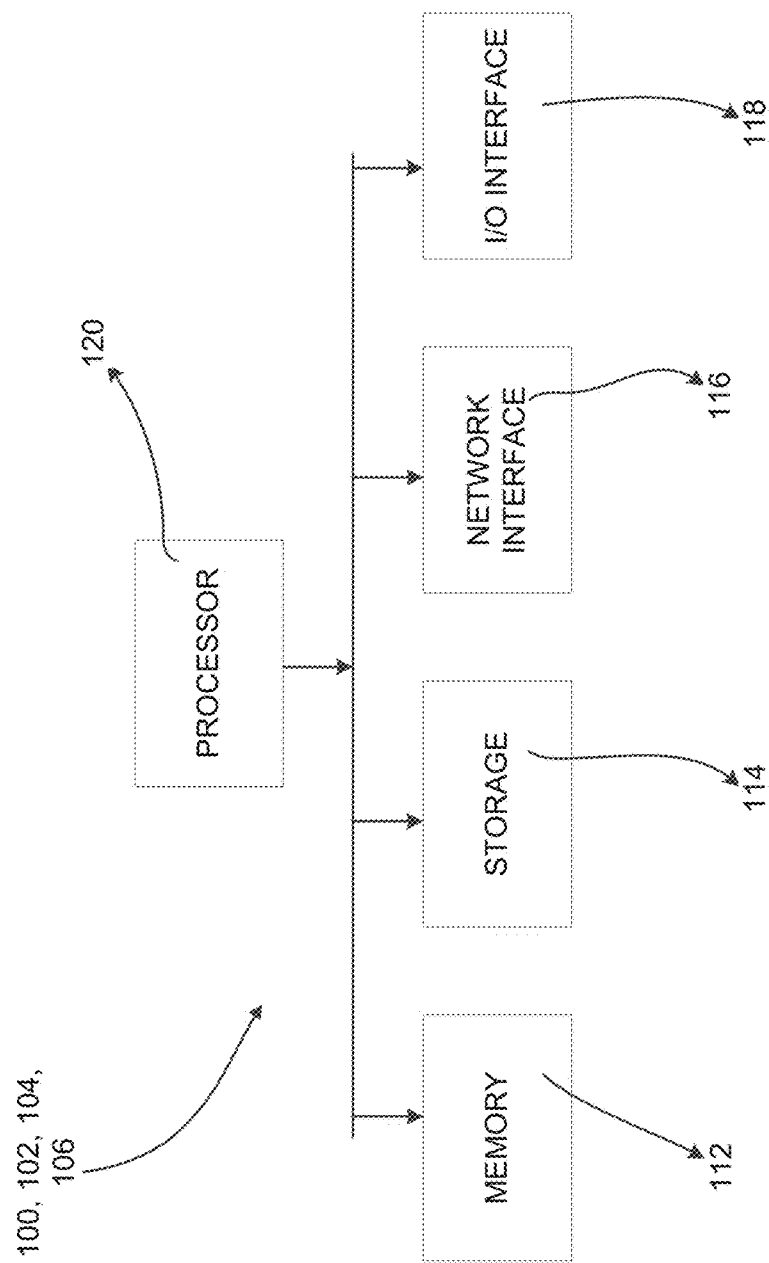
FIG. 4 is a diagram showing hardware components of an example computing system.

FIG. 4 is a block diagram of components of an example computing system 100, master server 102, resource server 104 or client computing device 106. As depicted, each of computing system 100, master server 102, resource server 104, or client computing device 106 includes one or more processors 120, memories 112, persistent storage 114, network interfaces 116 and input/output interfaces 118.

Each processor 120 can be, for example, any type of general-purpose microprocessor or microcontroller, a central processing unit (CPU) or graphics processing unit (GPU), a digital signal processing (DSP) processor, an integrated circuit, a field programmable gate array (FPGA), a reconfigurable processor, a programmable read-only memory (PROM), or any combination thereof. Processor 120 can operate under control of software stored, for example, in persistent storage 114 and loaded in memory 112. Network interface 116 connects master server 102, resource server 104 or client computing device 106 to networks 107. I/O interface 118 further connects master server 102, resource server 104 or client computing device 106 to one or more peripherals such as keyboards, mice, USB devices, disk drives, GPUs and the like.

Memory 112 and storage devices 114 are non-transitory computer readable media that can include one or a combination of any type of computer memory that is located either internally or externally (e.g., networked or peripheral), for example: hard drives, solid state memory (e.g., flash memory, random-access memory (RAM)), read-only memory (ROM), Blu-Ray™ or compact disc read-only memory (CD-ROM), electro-optical memory, magneto-optical memory, erasable programmable read-only memory (EPROM), and electrically-erasable programmable read-only memory (EEPROM), Ferroelectric RAM (FRAM) or the like. The memory(ies) and storage provided by these devices can be resources managed by the system 10.

In some examples, memory devices 112 include data or instruction sets for implementing, controlling or instructing DRM components, workloads and/or resources. The memory devices 112 include instructions or code for configuring one or more processors to perform any of the methods and functions described herein.

Input/output (I/O) interfaces 118 can enable a device to interconnect with one or more input devices. Network interfaces 116 enable devices to communicate with other components (such as other devices, DRM components or resources), to exchange data with other components, to access and connect to network resources, to serve applications, and to perform other computing applications. Network interfaces 116 connect to one or more wired or wireless networks capable of carrying data including the Internet, Ethernet, plain old telephone service (POTS) line, public switched telephone network (PSTN), integrated services digital network (ISDN), digital subscriber line (DSL), coaxial cable, fiber optics, satellite, mobile, wireless (e.g., WMAX), SS7 signaling network, Bluetooth™, near field communication (NFC), fixed line, local area network, wide area network, buses and others, including any combination of these.

In some examples, one or more I/O interfaces 118 enable a device to communicate, instruct, control, monitor or otherwise interconnect with a resource 105 (FIG. 1) or another device or system.

Each one of computing system 100, master servers 102, resource servers 104 and client computing devices 106 can be a separate physical device. In other embodiments, one or more of computing systems 100, master servers 102, resource servers 104 and client computing devices 106 and components thereof are virtualized devices residing in software at another computing device. Virtualized machines are accessible by other ones of computing systems 100, master servers 102, resource servers 104 and client computing devices 106, for example by way of network 107.

Figure 5:
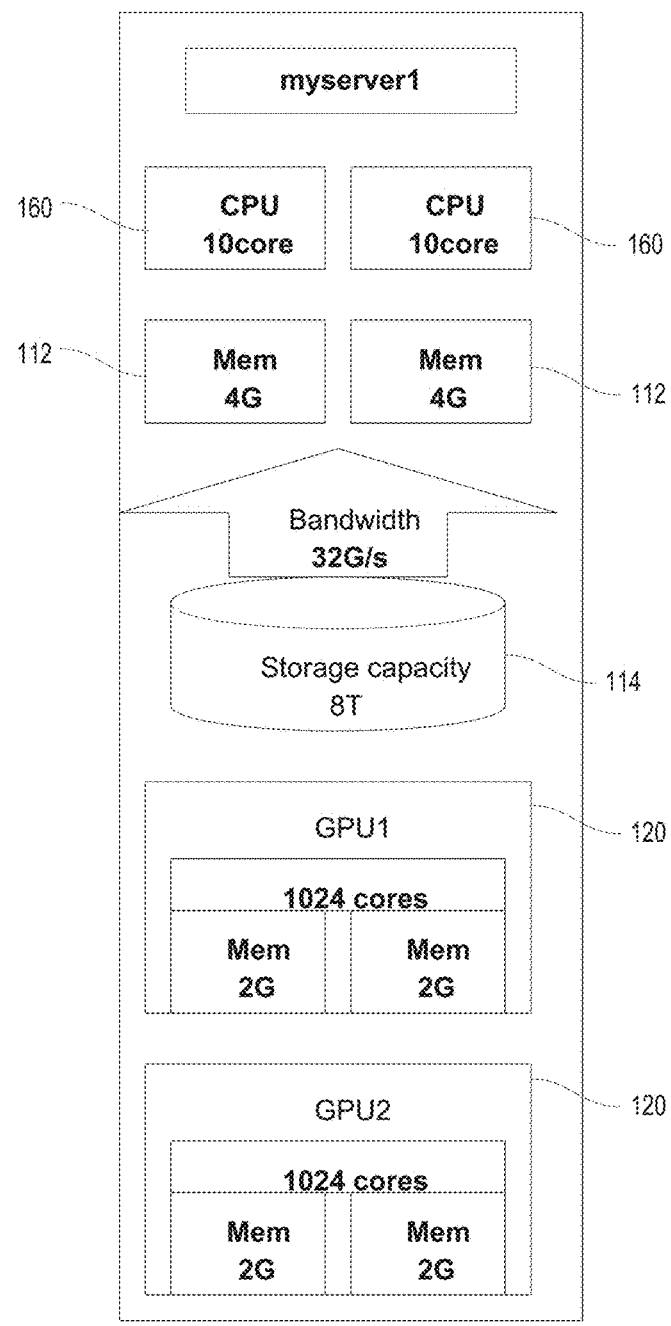
FIG. 5 is a diagram showing components of an example resource server.

FIG. 5 depicts components of an example resource server 104 in greater detail. The server 104 has two processors 160. Each processor 160 has ten cores. The server 104 also has two 4-GB memory modules 112, and an 8-TB storage 114 having a 32 Gb/s bandwidth. The server 104 also has two GPUs 120 named GPU1 and GPU2, each having 1024 cores and two 2-GB memory modules. Software is loaded onto server 102 from peripheral devices or from network 107. Such software is executed using processors 160.

Figure 6:
FIG. 6 is a diagram showing an arrangement of example computing systems.

FIG. 6 depicts an operating system 122 and application software 124 for this illustrative example of computing systems 100, master server 102, resource server 104 or client computer 106. Application software 124 is run within operating system software 122 for providing specific functions.

In some examples, application software 124 running at client computing devices 106 includes one or more applications, such as word processors, spreadsheet programs, internet browsers, email clients, database programs or database front-ends, photo or video editors, 2D or 3D graphics programs, and the like. Application software 124 can also include one or more modules for directing workloads for allocation by master server 102 to one of the resource servers 104. Such components may, for example, be in the form of application program interfaces (APIs) or daemons, which direct program instructions to master server 102. A daemon software application runs in the background on a computing device to take actions without direct explicit control by a user. For example, a daemon can intercept a call to a locally-running application and direct that call to master server 102.

Calls directed from tenant computing devices to master server 102 are messages or notifications sent over network 107, including one or more data fields identifying a workload to be executed and resources required for the workload. For example, a workload can have specific (e.g. minimum)

requirements for a number of central processing units (CPUs), memory, storage, software licenses, network capabilities, and so on.

Application software 124 running at resource servers 104 can include a DRM agent. The DRM agent monitors and reports resource availability to master server 102. DRM agents can be configured to accept requests from the tenants or client computing devices 106 (e.g. via the master server 102) to execute and control workloads at resource servers 104, and/or to monitor the life cycle of the workloads.

Figure 7:
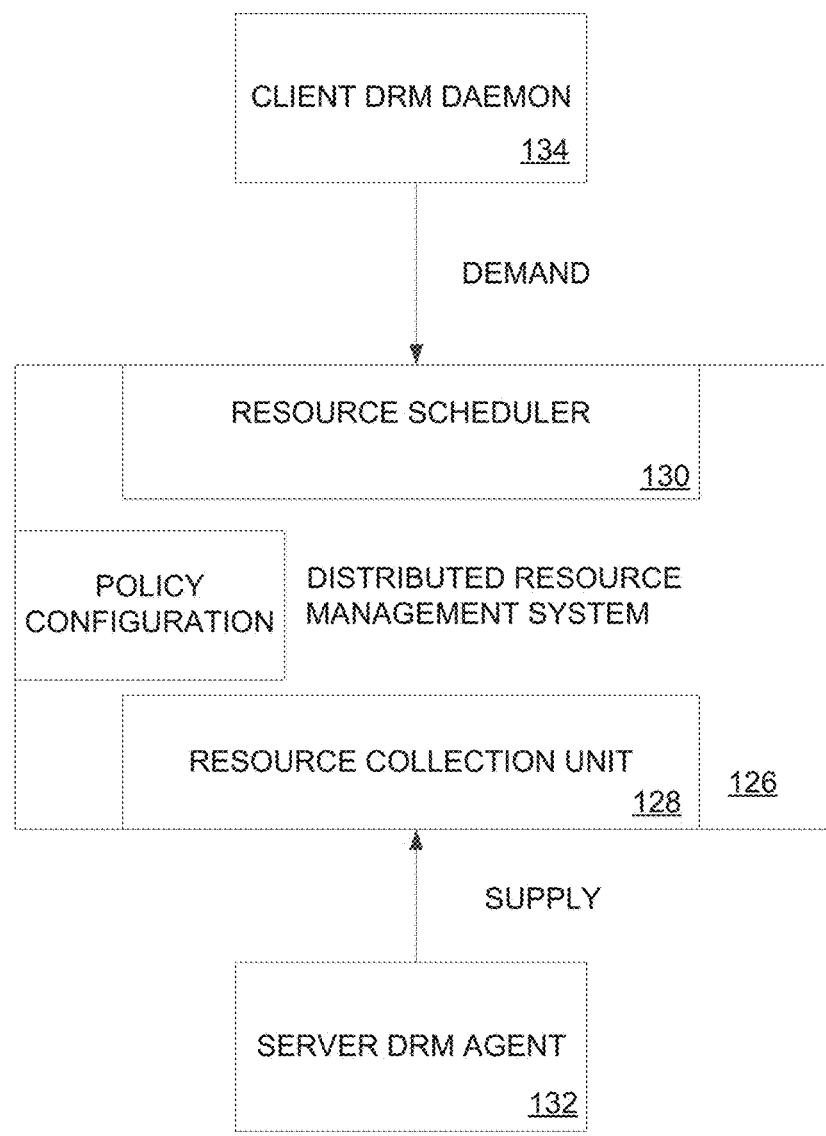
FIG. 7 is a diagram showing an example DRM system.

FIG. 7 illustrates an example DRM system 126 for multi-tenancy workloads, such as computing systems 100, master server 102, resource server 104 and client computer 106.

DRM system 126 includes a resource collection unit 128 and a resource scheduler 130. Resource collection unit 128 communicates with DRM agents 132 at resource servers 104 over network 107 and receives workloads at resource server 104. Resource scheduler 130 communicates with DRM daemons 134 at client computing devices 106 to receive requests for resource allocation to run workloads.

Resources can include, for example, processors or processor cores, memory, storage, graphics processors, network bandwidth, peripherals, or the like. Resource servers include plug-ins for configuring resource servers 104 to handle specific workloads, such as workloads from specific applications or tenants. DRM agents 132 communicate messages to resource collection unit 128 indicative of the workloads for such plugins.

Some instances of DRM agents communicate the status of resources other than computing resources of a resource server 104. For example, DRM agent 132 includes a license server loader for communicating status (e.g. availability) of software licenses. DRM agent 132 includes a storage server loader for communicating the status (e.g. availability, write-protect status) of a storage repository such as a database. DRM agent 132 includes a network switch loader for communicating the status of network resources, e.g. bandwidth, network switches or ports of network switches. DRM agent 132 resides at a resource server 104 or at master server 102.

Resource collection unit 128 maintains a policy configuration file containing a resource distribution policy for the hierarchical queue. The resource distribution policy is a record of resources available within computing system 100 based on messages received from DRM agents 132 and the hierarchical queue for managing resource allocation for tenants. In some embodiments, the policy configuration file also contains records identifying locations of resources and tenants. For example, resources can be identified as residing at a particular location in network 107, e.g. at a specific resource server 104, in communication with a particular network switch, or as residing in a particular server rack or cluster, geographical area, or the like.

Resource scheduler 130 receives messages from client computing devices 106 over network 107 indicative of demands for resources or requests for execution of workloads by users at client computing devices 106. Messages identify, for example, applications to be run, data to be processed, retrieved or stored or the like. The client computing devices 106 are tenants with workloads and associated resource requests.

Figure 8:
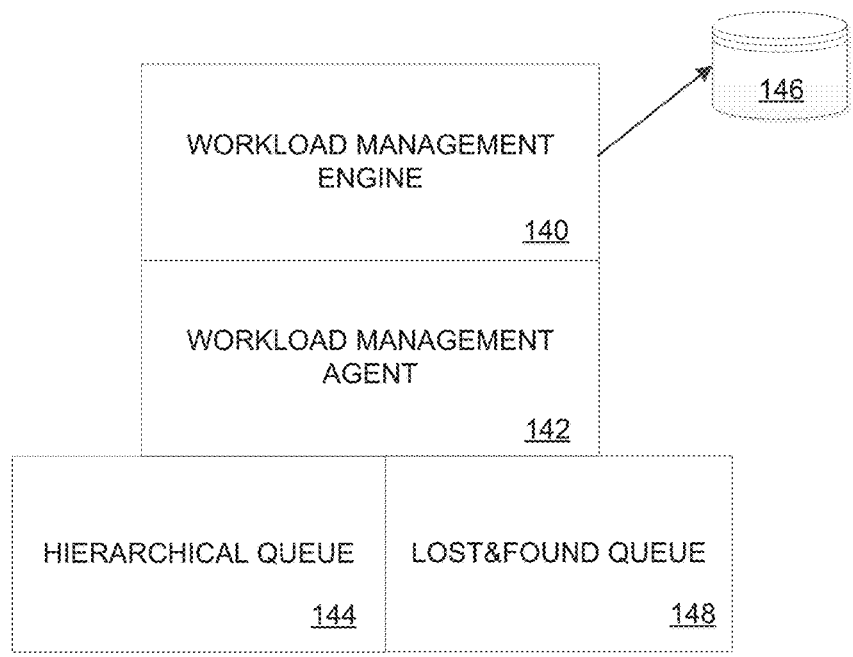
FIG. 8 is a diagram showing another example DRM system.

FIG. 8 shows another example DRM system with tenants structured as a hierarchical queue 144 to represent the resource distribution policy. The hierarchical queue is persistently stored in a data storage device 146.

A workload management agent 142 or workload management unit 140 detects a dynamic update to a tenant of the plurality of tenants structured as the hierarchical queue 144. The update involves a tenant having at least one workload associated with a resource request for the tenant. The rule-based workload management engine 140 is configured to retrieve an action for the workload associated with the resource request for the tenant. A workload management agent 142 updates the data structure for the hierarchical queue 144 based on the dynamic update by applying the action for the workload associated with the resource request for the tenant. The action involves transferring the task or workload to a Lost&Found queue 148. The workload management agent 142 makes the update without interrupting execution of the workload. The workload management unit 140 runs or schedules the workload based on the updated hierarchical queue.

Figure 9:
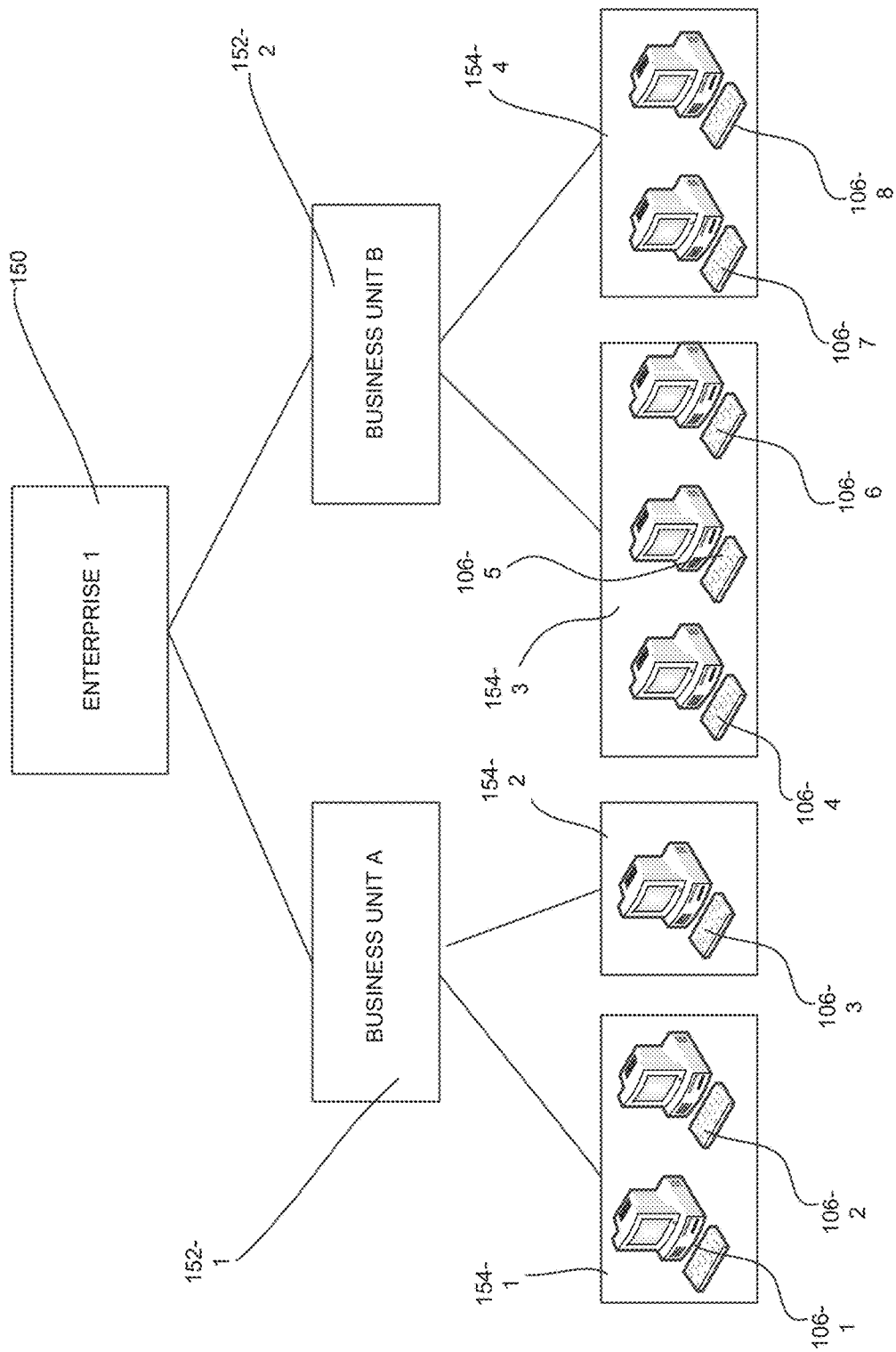
FIG. 9 is a diagram showing another example hierarchical queue.

FIG. 9 depicts an example hierarchical queue. A root tenant includes all of the client computing devices 106 belonging to a particular organization. Root tenant 150 occupies a top hierarchical tier and corresponds to the organization. The second tier includes two sub-tenants 152, each of which corresponds to a business unit within the organization. Each tenant has one or more leaf tenants 111, each of which includes one or more client computing devices 106.

In some embodiments, the DRM system 110 supports multiple organizations. An organization corresponds to a root tenant and has users grouped according to its own hierarchy of tenants. For example, one organization corresponds to a first root tenant, and may have second-tier tenants corresponding to business units, leaf tenants corresponding to departments within the business units, and individual users within the departments. Another organization corresponds to a second root tenant and may have second-tier tenants corresponding to geographical locations, such as cities or buildings, leaf tenants corresponding to departments at each location, and individual users belonging to the departments.

Client computing devices 106 can be permanently assigned to a tenant, for example, by virtue of being connected to a particular network. Additionally or alternatively, tenants may be defined as containing a specific set of users with specific user credentials. In such cases, client computing devices 106 may be associated to a group or sub-group on entry of a user's credentials.

Figure 10:
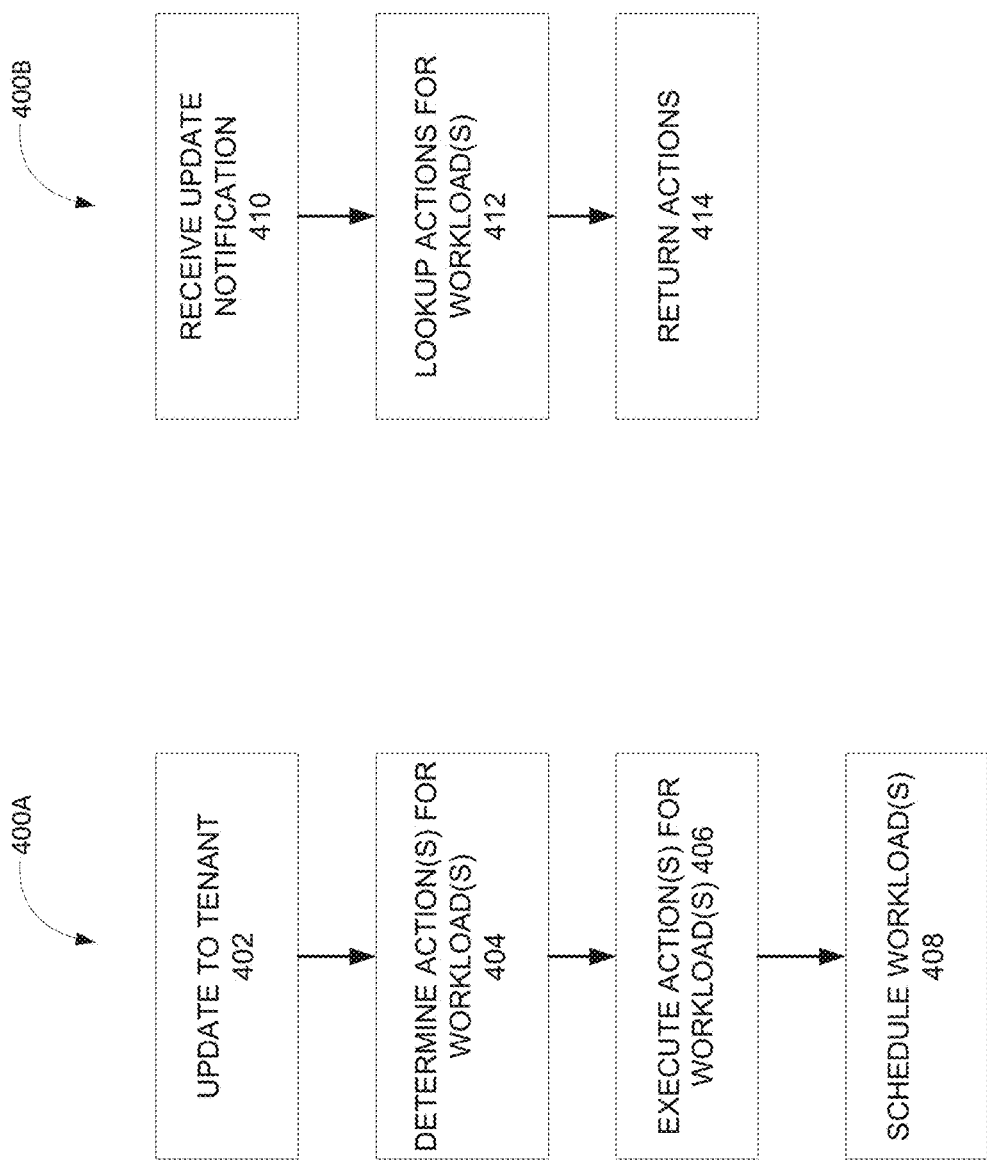

FIG. 10A shows a flowchart of process 400A for a DRM system and FIG. 10B shows a flowchart of a process 400B for a rule-based workload management engine. The processes 400A, 400B implement dynamic tenant structure adjustment in a runtime environment of the DRM system. For illustration, process 400A will be described with reference to computing system 100. However, process 400A (or aspects thereof) may be implemented by computing system 110 of FIG. 2 and components thereof.

At 402, the computing system 100 processes one or more updates for tenant organization(s). The tenant organization may change dynamically, for example by adding or removing tenants. A leaf tenant may become a non-leaf tenant in the hierarchical queue, or vice versa, for example.

A tenant structure change may be achieved by adding or removing tenants to the hierarchical queue. As an example, for a tenant update from a leaf tenant to a non-leaf tenant, the computing system 100 may delete the leaf tenant from the hierarchical queue, add the new non-leaf tenant to the hierarchical queue and add sub-tenants to the hierarchical queue. As another example, for a tenant update from a non-leaf tenant to a leaf tenant, the computing system 100 may delete the sub-tenant and the non-leaf tenant and add the new leaf tenant.

In some embodiments, when the tenant organization is modified, tenant updates impact one or more workloads. Workloads execute based on resource requests. The hierarchical queue defines the resource policy for allocating resources to run the workloads in response to the corresponding resource requests. In response to tenant updates, the computing system 100 redistributes one or more workloads in the hierarchical tenant queue and runs the workloads of the tenants based on the modified hierarchical queue.

Referring to FIG. 10A, at 404, the computing system 100 determines update actions by issuing commands to the rule-based workload management engine. The update actions indicate how the workloads should be handled or redistributed in response to the tenant update. The computing system 100 receives the corresponding actions from the rule-based workload management engine. At 406, computing system 100 executes the actions for workload adjustment in the hierarchical queue to respond to the tenant organization updates. At 408, the computing system 100 schedules or runs the workloads based on resource allocation defined by the adjusted hierarchical queue.

If there is an update to a tenant organization for the hierarchical queue, the computing system 100 generates an alert for the rule-based workload management engine with the latest tenant organization updates and workload information.

Referring to FIG. 10B, at 410, the rule-based workload management engine receives the alert or tenant update notification from computing system 100. At 412, the rule-based workload management engine retrieves pre-defined rules for tenants or workloads implicated by the tenant modification or update. The Rules match the tenant update based on a task matching expression field of the rule. The rules include actions for adjusting the hierarchical queue. At 414, the rule-based workload management engine returns the actions from the rules to computing system 100. The computing system 100 executes or applies the actions for each workload to adjust the hierarchical queue.

The rule-based workload management engine may use pre-defined rules for tenants. For example, an administrator or the DRM system can define rules for each tenant. As an illustrative example, a pre-defined rule may have three fields: tenant event, task matching expression, and actions. The field "tenant event" may be used by the DRM system to evaluate whether this rule is applicable to the tenant modification. Task matching expressions of the rules may be used to filter out the target workloads of tenants implicated by the tenant update. The rules include an action field that defines the action for the workloads in response to the notification of the tenant modification.

A rule may include fields for multiple tenant events that map to tenant modifications to the hierarchical queue. For example, a specific tenant is deleted or a specific tenant is added at 402. When an event occurs that matches a rule based on the tenant event field, the workload management engine will retrieve this rule at 412. The matching expression defines properties of a workload. The properties of a workload could be, for example, the user of a workload, ID of a workload, creation time of a workload, and so on. Administrator or computing system 100 can define multiple actions which may be applied to workloads selected by the matching expression of the rule. Example actions may include, but are not limited to, killing a workload, moving a workload, suspending a workload, and so on.

For example, the rule-based workload management engine defines the following rule:
Company.R&D.Ottawa: <onEvent="delete company.R&D.Ottawa", User=John && ID<1000", action="move to Company.R&D.Toronto" && action="suspend">

The example rule has an action that moves all John's workloads that have ID less than 1000 to company.R&D.Toronto and an action that suspends those workloads when company.R&D.Ottawa is removed from the tenant organization.

As another example, the rule-based workload management engine defines the following rule:
Company.R&D.Toronto: <onEvent="configuration updates Company.R&D.Toronto", User=Bob && Status=PENDING", action="kill">

The example rule kills all Bob's workloads in pending status when the administrator updates the configuration of tenant company.R&D.Toronto.

Another example illustrates how workloads in the Lost&Found queue can be moved back to a normal tenant queue. An example rule for the Lost&Found queue is <onEvent="add company.R&D.Toronto.Markham", User=Charley, action="move to Company.R&D.Toronto.Markham">

The example rule moves all workloads for user Charley that are in the Lost&Found queue to Company.R&D.Toronto.Markham when company.R&D.Toronto.Markham queue is added.

Figure 11:
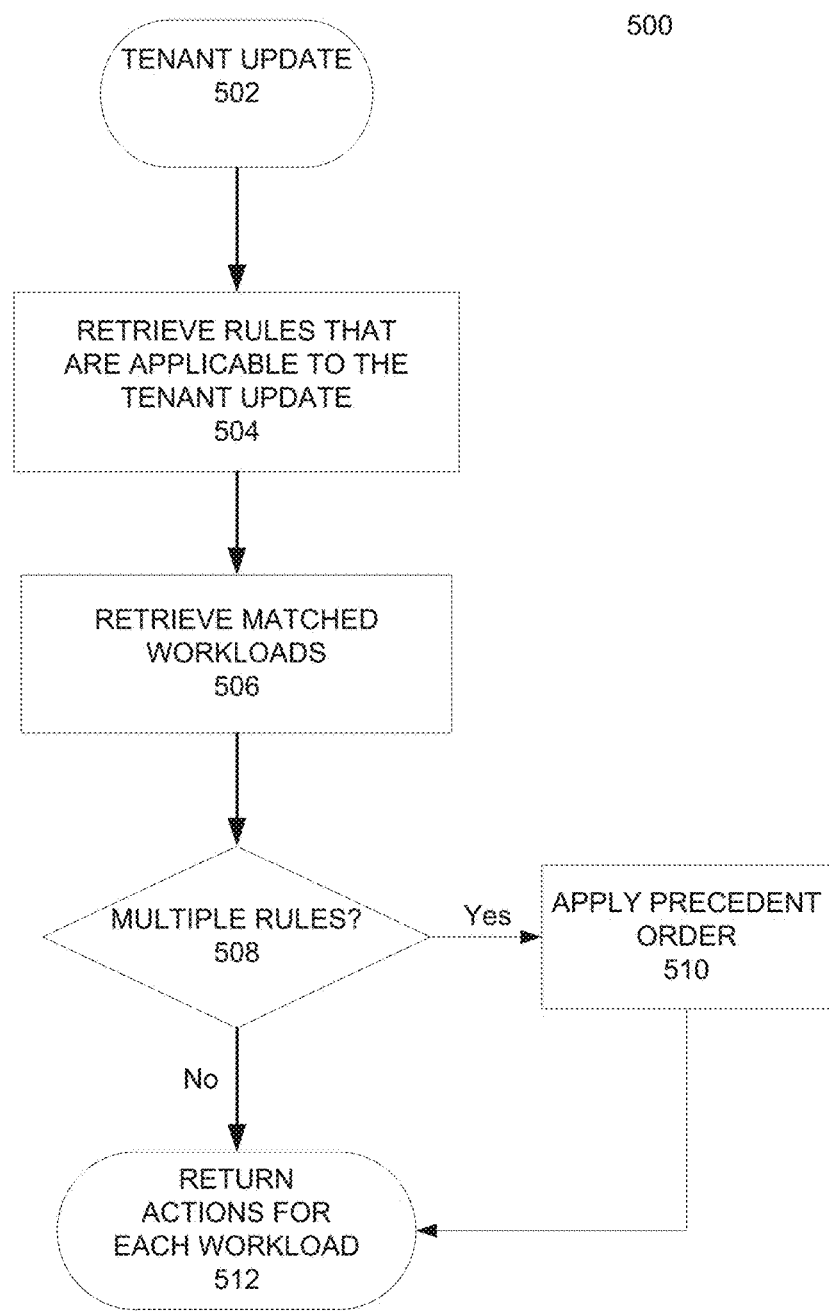

FIG. 11 shows a flowchart of an example process 500 implemented by computing system 100.

At 502, a tenant update or modification for the hierarchical queue occurs. Computing system 100 determines that there is a tenant modification. Example tenant updates include adding a new tenant, removing an existing tenant, moving an existing tenant to a new position in the hierarchical queue, and so on. The tenant update implicates one or more workloads having resource requests. Once a tenant update occurs, computing system 100 sends a notification to the workload management engine. For example, computing system 100 may detect the update and generate a corresponding notification of the update for transmission to the rule-based workload management engine.

At 504, the rule-based workload management engine identifies the rules of tenants that are applicable to the tenant update. As noted, each rule may have an "tenant event" field that is used to evaluate whether a particular rule is applicable to the tenant update. For example, the rule may include an action that implicates the workload in response to a tenant update. The rule has a "tenant event" field that corresponds to the tenant update to trigger the action for the workload.

At 506, the rule-based workload management engine identifies rules that match the workloads based on task matching expression of rules. The "tenant event" field is used to flag rules applicable to the tenant modification. As noted, each rule may have a "task matching" field that is used to filter out target workloads of the tenant implicated by the tenant update.

At 508, the rule-based workload management engine determines whether multiple rules are applicable for a workload implicated by the tenant update. If multiple rules are applicable for a workload, at 510, a priority configuration or sequence (e.g. in the policy configuration) may define the precedence order for rules. The priority sequence for the rules may be based on the tenant update, for example. As an example priority sequence, rules from workloads for a sub-tenant may override rules from workloads for its parent tenant.

At 512, the rule-based workload management engine returns actions for each workload related to the tenant update. The rule-based workload management engine may return actions of each workload to the DRM system. The rule-based workload management engine may be a plug-in of the DRM system or may have a communication link with the DRM system.

Figure 12:
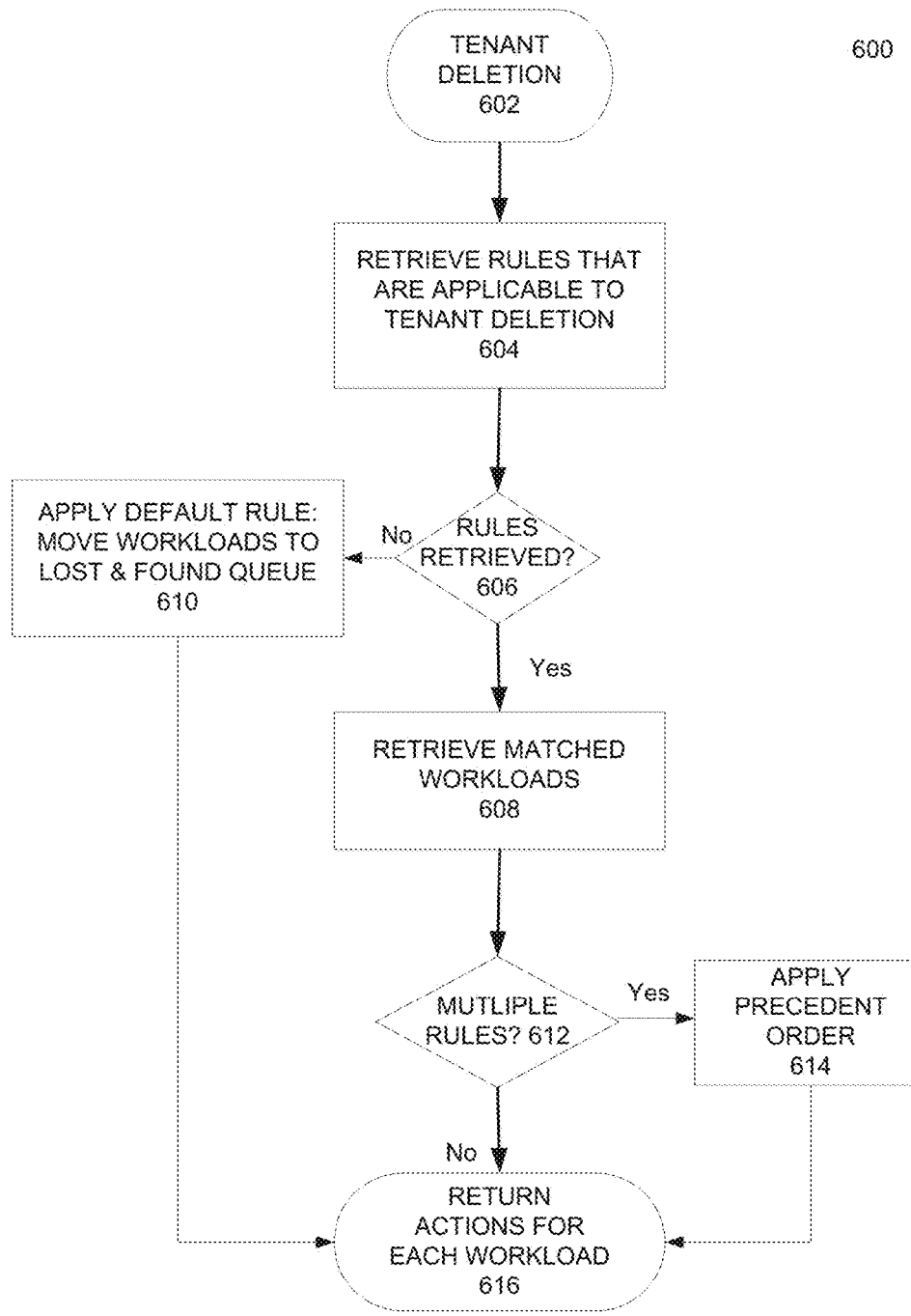

FIG. 12 shows a flowchart diagram of an example process implemented by components of the computing system 100 and the rule-based workload management engine when a tenant is deleted from the hierarchical queue.

At 602, a tenant deletion from the hierarchical queue occurs. Computing system 100 detects the tenant deletion and sends a notification to the rule-based workload management engine. The rule-based workload management engine receives the notification. For example, computing system 100 may detect the deletion and generate a corresponding notification of the tenant deletion for transmission to the rule-based workload management engine. The notification may identify one or more tenants and one or more workloads implicated by the tenant update.

At 604, the rule-based workload management engine retrieves the rules of tenants that are applicable to the tenant deletion. The rule-based workload management engine may process the "tenant event" field of the rules to evaluate whether a particular rule is applicable to the tenant deletion. The rule-based workload management engine locates all rules applicable to the tenant deletion.

At 606, the rule-based workload management engine determines whether there are any rules applicable to the tenant deletion. If so, at 608, the rule-based workload management engine retrieves the matched workloads based on the task matching expression of rules flagged as being applicable to the tenant deletion. The rule-based workload management engine may use the "task matching" field of the rule that is used to filter out target workloads of the tenant related to the tenant deletion. If not, at 610, the rule-based workload management engine applies a default rule to move all workloads related to the tenant deletion to the Lost&Found queue for processing. If the administrator or the rule-based workload management engine does not define rules for the tenant deletion, a default rule will be triggered. The default rule moves workloads under the deleted tenant to the Lost&Found queue.

At 612, the rule-based workload management engine determines whether multiple rules are applicable for a workload related to the tenant deletion. If multiple rules are applicable for a workload, at 614, a priority configuration or sequence (e.g. in the policy configuration) may define the precedence order for rules.

At 616, the rule-based workload management engine returns actions for each workload related to the tenant deletion.

Figure 13:
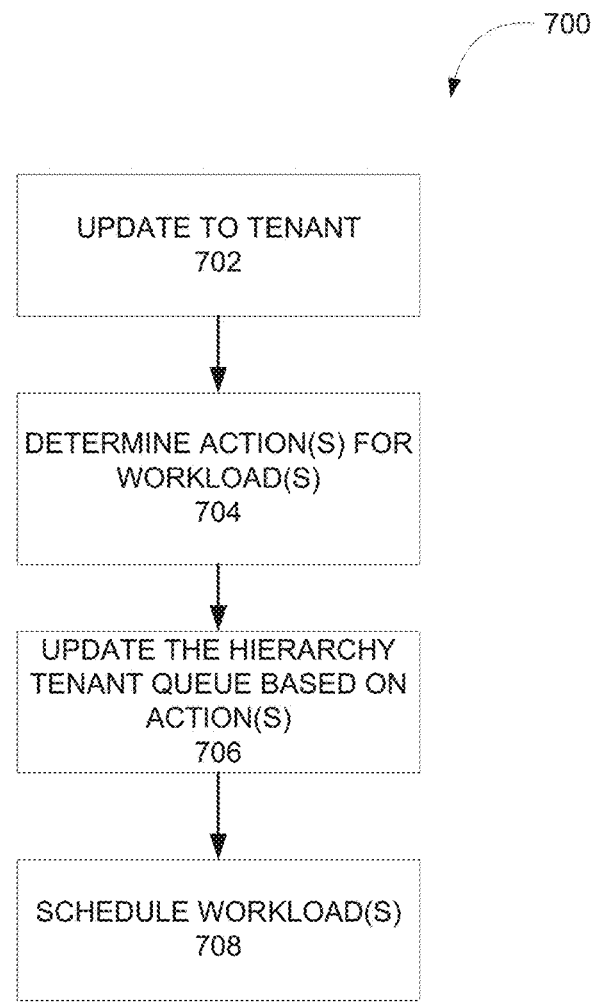

FIG. 13 shows a flowchart diagram of an example process 700 implemented by a DRM system.

At 702, the DRM system detects a dynamic update to a tenant of the hierarchical queue. The tenant has at least one workload with a resource request for redistribution.

At 704, the DRM system receives a rule defining an action for the workload associated with the resource request for the tenant. As noted, a rule-based workload management engine may return the rule to the DRM system based on the tenant event and task matching fields.

At 706, the DRM system updates the data structure for the hierarchical queue based on the dynamic update. The DRM system applies the action for the workload associated with the resource request for the tenant without killing or draining the workload.

At 708, the DRM system schedules workloads using resources allocated by the updated hierarchical queue.

Embodiments described herein provide DRM system interacting with a rule-based workload management engine to manage workloads if the tenant structure changes or updates dynamically. The administrator can dynamically update the queue hierarchy using rules with fields for tenant events, workloads, and actions. An action is automatically applied to workloads based on pre-defined rules if the tenant structure changes (e.g. a tenant is added or removed from the priority queue). The rule-based workload management engine manages workloads for the administrator.

If the rule-based workload management engine does not have a pre-defined rule or priority ranking for prioritizing multiple rules for a workload, a Lost&Found queue may be used to hold orphan workloads. The Lost&Found queue may be configured by the DRM system to run workloads.

Embodiments described herein provide a DRM system with an improved Lost&Found queue. In an aspect, among all tenants, the Lost&Found queue may have the lowest priority for resource allocation. Orphan workloads in the Lost&Found queue may still be scheduled as long as there are idle resources allocated to the Lost&Found queue. The DRM system moves orphan workloads in the Lost&Found queue back to the normal hierarchical queues. For example, orphan workloads are automatically moved back to a tenant node in the hierarchical queue when certain tenant events occur. The Lost&Found queue is also considered a node in the hierarchical queue and with associated rules and allocated resources. When a tenant update occurs, the rules trigger a workload to move back to a normal tenant queue.

Embodiments described herein provide a DRM system that is flexible so that a hierarchical queue can be updated while running workloads using available resources allocated by the hierarchical queue.

In an aspect, embodiments described herein may implement a Lost&Found queue for workloads related to the tenant update. For example, the default behavior for orphan workloads that cannot find matched actions may be for the DRM system to move the workloads to the Lost&Found queue in DRM system 100. Workloads in the Lost&Found queue can continue running if the needed resources are available. In some examples, an administrator can configure rules for the Lost&Found queue. The DRM computing system 100 moves workloads from the Lost&Found queue and back to an associated tenant.

In another aspect, embodiments described herein may provide a rule-based workload management engine and DRM system 100 that supports dynamic tenant structure adjustment while running workloads related to updates to tenants in a hierarchical queue. The rule-based workload management engine and DRM system 100 can update the tenant organization in a runtime environment.

In an aspect, embodiments described herein may provide a rule-based workload management engine and DRM system 100. Rules defined for tenants are automatically applied to corresponding workloads when tenant events occur. The automatic adjustment helps reduce the management effort of the administrator. For example, an administrator does not need to manually move orphan workloads back to a normal hierarchical queue. Instead, the use of pre-defined rules may achieve the same goal.

Embodiments described herein may provide a rule-based workload management engine and DRM system that can update the tenant organization in a runtime environment. Embodiments described herein may provide a rule-based workload management engine and DRM system that can remove or add a tenant while running workloads. Embodiments described herein may provide a rule-based workload management engine and DRM system 100 that supports pre-defined rules and can apply the pre-defined actions to corresponding workloads. This helps reduce the maintenance effort of administrator.

Embodiments disclosed herein may be implemented using hardware, software or some combination thereof. Based on such understandings, the technical solution may be embodied in the form of a software product. The software product may be stored in a non-volatile or non-transitory storage medium, which can be, for example, a compact disk read-only memory (CD-ROM), USB flash disk, a removable hard disk, flash memory, hard drive, or the like. The software product includes a number of instructions that enable a computing device (computer, server, mainframe, or network device) to execute the methods provided herein.

Program code may be applied to input data to perform the functions described herein and to generate output information. The output information is applied to one or more output devices. In some embodiments, the communication interface may be a network communication interface. In embodiments in which elements are combined, the communication interface may be a software communication interface, such as those for inter-process communication. In still other embodiments, there may be a combination of communication interfaces implemented as hardware, software, and/or combination thereof.

Each computer program may be stored on a storage media or a device (e.g., ROM, magnetic disk, optical disc), readable by a general or special purpose programmable computer, for configuring and operating the computer when the storage media or device is read by the computer to perform the procedures described herein. Embodiments of the system may also be considered to be implemented as a non-transitory computer-readable storage medium, configured with a computer program. The storage medium so configured causes a computer to operate in a specific and pre-defined manner to perform the functions described herein.

Furthermore, the systems and methods of the described embodiments are capable of being distributed in a computer program product including a physical, non-transitory computer readable medium that bears computer usable instructions for one or more processors. The medium may be provided in various forms, including one or more diskettes, compact disks, tapes, chips, magnetic and electronic storage media, volatile memory, non-volatile memory and the like. Non-transitory computer-readable media may include all computer-readable media, with the exception being a transitory, propagating signal. The term non-transitory is not intended to exclude computer readable media such as primary memory, volatile memory, RAM and so on. The data stored thereon may only be temporarily stored. The computer useable instructions may also be in various forms, including compiled and non-compiled code.

The present disclosure may make numerous references to servers, services, interfaces, portals, platforms, or other systems formed from hardware devices. It should be appreciated that the use of such terms is deemed to represent one or more devices having at least one processor configured to execute software instructions stored on a computer readable tangible, non-transitory medium. One should further appreciate the disclosed computer-based algorithms, processes, methods, or other types of instruction sets can be embodied as a computer program product comprising a non-transitory, tangible computer readable media storing the instructions that cause a processor to execute the disclosed steps.

Various example embodiments are described herein. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

The embodiments described herein are implemented by physical computer hardware embodiments. The embodiments described herein provide useful physical machines and particularly configured computer hardware arrangements of computing devices, servers, processors, memory, networks, for example. The embodiments described herein, for example, are directed to computer apparatuses, and methods implemented by computers through the processing and transformation of electronic data signals.

The embodiments described herein may involve computing devices, servers, receivers, transmitters, processors, memory(ies), displays, networks particularly configured to implement various acts. The embodiments described herein are directed to electronic machines adapted for processing and transforming electromagnetic signals which represent various types of information. The embodiments described herein pervasively and integrally relate to machines and their uses; the embodiments described herein have no meaning or practical applicability outside their use with computer hardware, machines, a various hardware components.

Substituting the computing devices, servers, receivers, transmitters, processors, memory, display, networks particularly configured to implement various acts for non-physical hardware, using mental steps for example, may substantially affect the way the embodiments work.

Such hardware limitations are clearly essential elements of the embodiments described herein, and they cannot be omitted or substituted for mental means without having a material effect on the operation and structure of the embodiments described herein. The hardware is essential to the embodiments described herein and is not merely used to perform steps expeditiously and in an efficient manner.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A process for managing workloads by a distributed resource management system of a distributed computing system, the process comprising:
receiving a tenant update for a hierarchical queue, the hierarchical queue comprising tenants and sub-tenants, the tenant update identifying a modification to a tenant or sub-tenant of the hierarchical queue;
retrieving, by a rule-based workload management engine, a rule having a tenant event corresponding to the tenant update, wherein the rule-based workload management engine retrieves the rule from a database storing rules, each rule stored in the database including a tenant event identifying a tenant or sub-tenant of the tenants or sub-tenants the rule is applicable to and an action for one or more workloads of the tenant or sub-tenant;
determining, from the retrieved rule, the action for the one or more workloads of the tenant or sub-tenant identified in the tenant event of the retrieved rule, each of the one or more workloads of the tenant or sub-tenant identified associated with a resource request; and
applying the action for the one or more workloads of the tenant or sub-tenant, without interrupting execution of any workloads of other tenants or sub-tenants of the hierarchical queue.

2. The process of claim 1, the action for the one or more workloads of the tenant or sub-tenant comprises killing at least one of the one or more workloads, moving at least one of the one or more workloads, and suspending at least one of the one or more workloads.

3. The process of claim 1, wherein each rule further includes a workload matching expression.

4. The process of claim 3, wherein retrieving further comprises identifying, by the rule-based workload management engine, the rule corresponding to the tenant event, and determining which ones of the one or more workloads of the tenant or sub-tenant identified in the tenant event of the retrieved rule match the workload matching expression, and wherein applying the action comprises applying the action to the determined ones of the one or more workflows of the tenant or sub-tenant.

5. The process of claim 3, further comprising, by the rule-based workload management engine:
retrieving a set of rules having a tenant event corresponding to the tenant update;
filtering the set of rules using the workload matching expressions;
upon determining that the filtered set of rules include multiple rules, ordering the filtered set of rules based on a priority sequence; and
returning actions for the one or more workloads for the tenant or sub-tenant from the ordered, filtered set of rules.

6. The process of claim 1, wherein retrieving further comprises sending a request to the rule-based workload management engine, the request comprising the tenant update.

7. The process of claim 6, further comprising determining that no rules correspond to the tenant update and returning one or more default rules to move the one or more workloads for the tenant or sub-tenant to a Lost&Found queue.

8. The process of claim 1, wherein applying the action for the one or more workloads for the tenant or sub-tenant comprises applying a default action to move the one or more workloads to a Lost&Found queue.

9. The process of claim 8, further comprising moving the one or more workloads from the Lost&Found queue back to the hierarchical queue.

10. The process of claim 1, wherein the tenant update identifying a modification to a tenant or sub-tenant of the hierarchical queue comprises one of: deleting the tenant or sub-tenant from the hierarchical queue, adding the tenant or sub-tenant to the hierarchical queue, and moving a location of the tenant or sub-tenant in the hierarchical queue.

11. A device comprising a processor and a memory storing instructions to configure the processor with a rule-based workload management engine to:
receive a tenant update for a hierarchical queue, the hierarchical queue comprising tenants and sub-tenants, the tenant update identifying a modification to a tenant or sub-tenant of the hierarchical queue;
retrieve a rule having a tenant event corresponding to the tenant update, wherein the rule is retrieved from a database storing rules, each rule stored in the database including a tenant event identifying a tenant or sub-tenant of the tenants or sub-tenants the rule is applicable to and an action for one or more workloads of the tenant or sub-tenant;
determine, from the retrieved rule, the action for the one or more workloads of the tenant or sub-tenant identified in the tenant event of the retrieved rule, each of the one or more workloads of the tenant or sub-tenant identified associated with a resource request; and
apply the action for the one or more workloads of the tenant or sub-tenant without interrupting execution of any workloads of other tenants or sub-tenants of the hierarchical queue.

12. The device of claim 11, wherein the action for the one or more workloads of the tenant or sub-tenant comprises killing at least one of the one or more workloads, moving at least one of the one or more workloads, and suspending at least one of the one or more workloads.

13. The device of claim 11, wherein each rule further includes a workload matching expression.

14. The device of claim 11, wherein the rule-based workload management engine has rules with a component for a workload matching expression to determine that the rule is applicable to the workload memory stores instructions to further configure the processor with the rule-based workload management engine to retrieve a rule by identifying the rule corresponding to the tenant event, determining which ones of the one or more workloads of the tenant or sub-tenant identified in the tenant event of the retrieved rule match the workload matching expression, and to apply the action to the determined ones of the one or more workflows of the tenant or sub-tenant.

15. The device of claim 14, wherein the memory stores instructions to further configure the processor with the rule-based workload management engine to:
retrieve a set of rules having a tenant event corresponding to the tenant update;
filter the set of rules using the workload matching expressions;
upon determining that the filtered set of rules include multiple rules, ordering the filtered set of rules based on a priority sequence; and
returning actions for the one or more workloads for the tenant or sub-tenant from the ordered, filtered set of rules.

16. The device of claim 14, wherein the memory stores instructions to further configure the processor with the rule-based workload management engine to determined that no rules correspond to the tenant update and returning one or more default rules to move the one or more workloads for the tenant or sub-tenant to a Lost&Found queue.

17. The device of claim 14, wherein the memory stores instructions to further configure the processor with the rule-based workload management engine to move the one or more workloads from the Lost&Found queue back to the hierarchical queue.

18. The device of claim 11, wherein the action for the one or more workloads for the tenant or sub-tenant is applied by applying a default action to move the one or more workloads to a Lost&Found queue.

19. The device of claim 11, wherein the tenant update identifying a modification to a tenant or sub-tenant of the hierarchical queue comprises one of: deleting the tenant or sub-tenant from the hierarchical queue, adding the tenant or sub-tenant to the hierarchical queue, and moving a location of the tenant or sub-tenant in the hierarchical queue.

* * * * *